July 21, 1931.  A. A. SCARLETT  1,815,332
CASTER WHEEL LOCK FOR PLOWS
Filed July 30, 1930   2 Sheets-Sheet 2
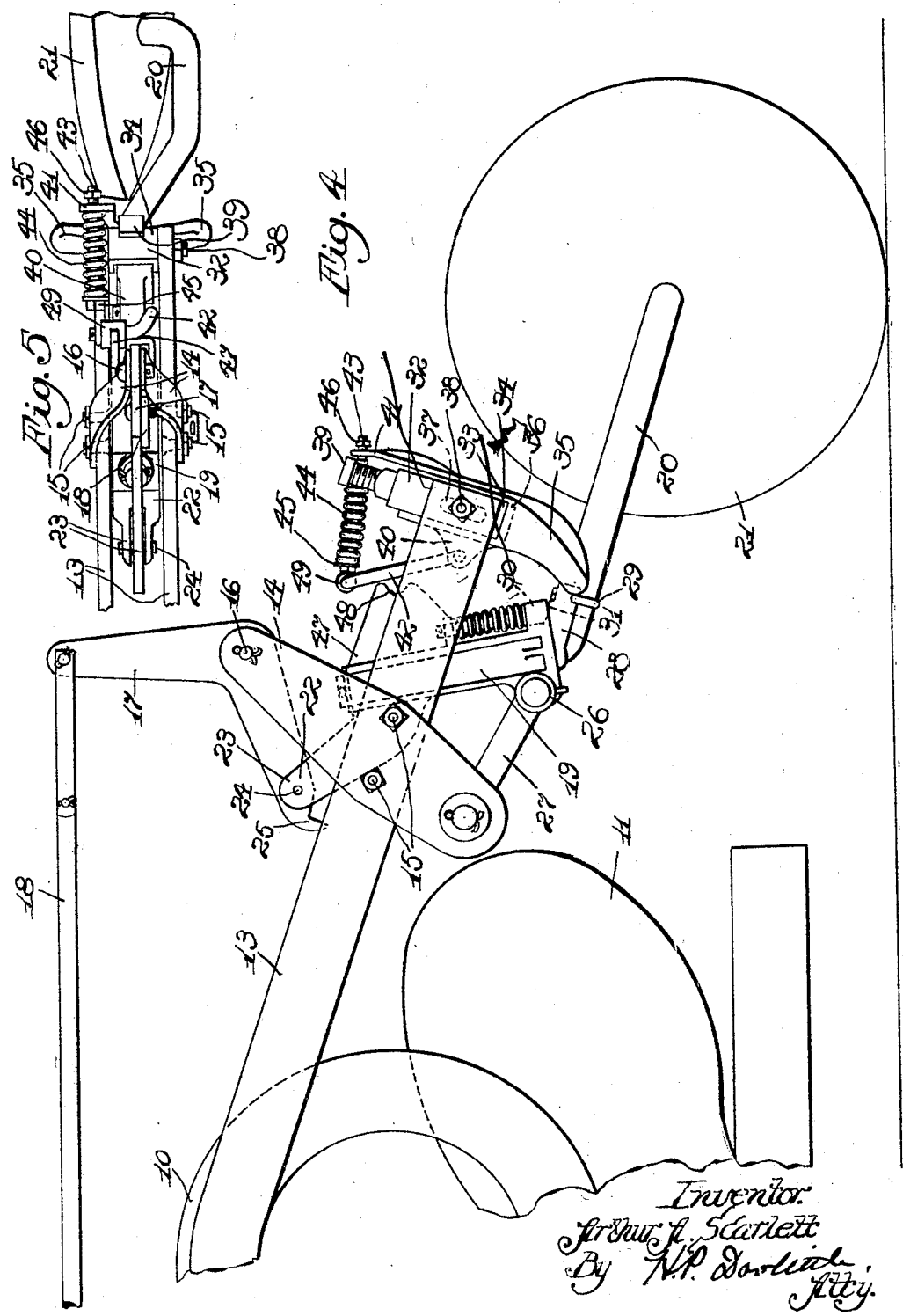

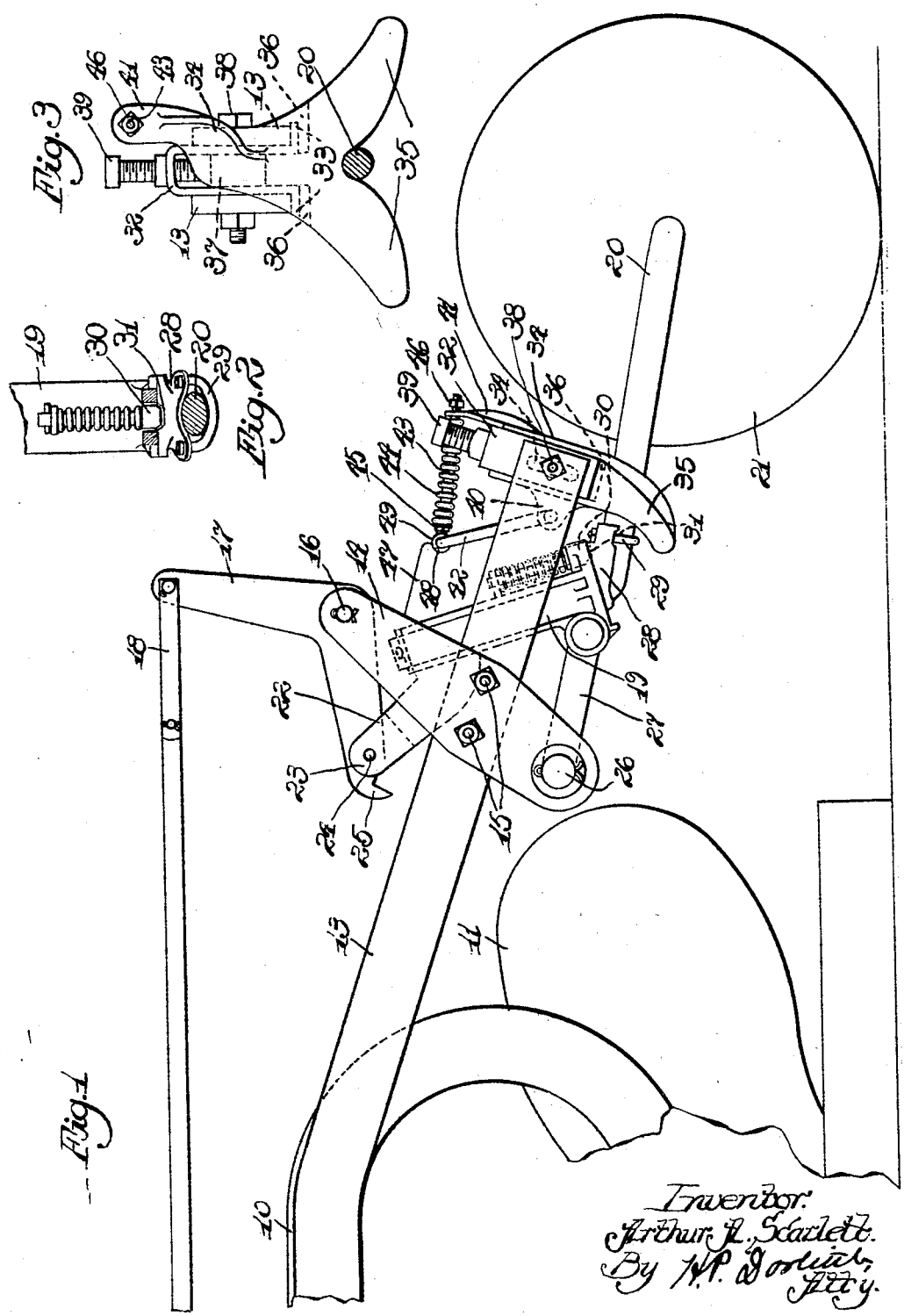

Patented July 21, 1931

1,815,332

UNITED STATES PATENT OFFICE

ARTHUR A. SCARLETT, OF HAMILTON, ONTARIO, CANADA, ASSIGNOR TO INTERNATIONAL HARVESTER COMPANY, OF CHICAGO, ILLINOIS, A CORPORATION OF NEW JERSEY

CASTER WHEEL LOCK FOR PLOWS

Application filed July 30, 1930. Serial No. 471,711.

This invention relates to a rear wheel lock for plows.

The object of the invention is to provide an automatic locking device for keeping the rear wheel locked against swiveling movement when the plow is in operating position.

Another object is to provide such a means which is automatically disengaged when the plow is raised.

Other more specific objects will be apparent from the detailed description to follow.

Referring to the drawings:

Figure 1 is a side elevation showing a portion of a plow and a rear wheel attachment embodying the invention;

Figure 2 is a detailed sectional view, showing means for attaching the rear wheel axle to its support;

Figure 3 is an enlarged sectional view, showing the locking member which holds the rear wheel axle in position during operation of the plow;

Figure 4 shows the same elements as Figure 1 with the plow in a partially aligned position; and, Figure 5 is a plan view of the same structure shown in Figures 1 and 4.

In the operation of a plow, it is often desirable or necessary to back the plow while it is in lowered or operating position. The rear wheel is usually mounted on a swiveled axle which permits it to turn and follow the plow in any direction. However, when backing, a wheel attached in such a manner is very apt to turn. The purpose of this invention is to provide means for allowing the rear wheel to swivel when the plow is in raised position and to provide means for locking it when the plow is in operating condition.

Only a portion of the beam 10 and a moldboard 11 of the plow is shown in the drawings. A pair of flat extending bars 13 are rigidly secured to the beam 10 by any desirable means and extend rearwardly in spaced relationship with respect to each other. Spaced from the rear end of the bars 13, a pair of plates 14 are transversely positioned and rigidly secured on the outsides of the spaced bars 13 by counter-sunk bolts 15.

The upper ends of the plates 14 are bent together and provided with openings through which a pin 16 extends. A bell crank 17 is pivoted at the bend on the pin 16 between the two plates 14. One leg of the bell crank extends substantially vertically upwardly, and the other leg extends forwardly. A link 18 is pivotally connected to the upper end of the upwardly extending leg of the bell crank. The link 18 is adapted to be connected to the power lift mechanism of the plow so that a forward pull is exerted when the plow is lifted from operative position. A bearing and supporting member 19 in the form of a casting adapted to support the axle 20, on which the rear wheel 21 is mounted, is positioned between the two spaced bars 13. An integral, upward extension 22 on the member 19 is provided with a pair of spaced ears 23 between which the forwardly extending leg of the bell crank extends. A pin 24 extending through the ears 23 and through the end of the belt crank pivotally connects said members together. At the extreme forward end of the bell crank 17, an integral extension 25 is positioned to abut against the extension 22, to form a stop for limiting the relative movement of said members. At the lower end of the member 19, a transverse bore 26 is provided, through which one end of a U-shaped link 27 extends. The other end of the link 27 extends through aligned openings in the lower portions of the plates 14.

The axle 20 on which the rear wheel is mounted has an angularly upwardly extending portion, which extends through a bore formed in the member 19. A collar 28 is clamped on the axle 20 adjacent the bend by a U-bolt 29 to form a bearing surface, which is in contact with the lower end of the member 19. A spring pressed latch 30 mounted on the member 19 is adapted to engage a notch 31 in the collar 28 to prevent undue rotation of the axle 20. The spring in the latch device is of such a strength and the notch is so constructed that the latch mechanism acts as a retarding device, but does not prevent rotation of the axle 20 when sufficient force is applied thereto.

At the extreme rear ends of the bars 13, a U-shaped member 32 is inserted between the bars. Outwardly turned edges 33 extend under the lower edges of the bars 13. A locking member in the form of a casting 34 is provided with a pair of outward extensions 35, which are adapted to engage opposite sides of the axle 20 for maintaining the plow in straight forward movement. Recesses 36 are formed in the sides of the member 34, into which the sides of the U-shaped member are slidably fitted. A slot 37 is formed in the member 34 between the two recesses 36. A bolt 38 extends through the ends of the bars 13, through the U-shaped member 32, and through the slot in the member 34. It will be understood that, limited by the length of the slot 38, the member 34 may be mounted with respect to the U-shaped member 32, which is rigidly mounted on the bars 13. A screw 39 extends through the top of the U-shaped member 32 and is adjustable to vary the position of the member 34 with respect to the position of the U-shaped member 32. An apertured forward extension 40 and a similar upward extension 41 provides means for connecting a spring pressed locking device to the lifting and guiding means. A link 42 is pivotally connected to the forward extension 40 and to a substantially horizontal link 43. The link 43 extends horizontally through the bracket 41. A compression spring 44 is mounted on the link 43 and abuts against a stop 45 on the link and against the extension 41. A nut 46 beyond the extension 41 provides means for adjusting the tension of the spring 44. A rearward extension 47, integral with the member 19, is provided with a notch 48. A roller 49 mounted horizontally on the upper end of the link 42 is adapted to seat in the notch 48 when the plow is in operative position. Figure 1 shows the roller seated, and Figure 4 shows it disengaged with the plow in a partially aligned position.

In the operation of the device of this invention, the operative position of the plow will be first considered as illustrated in Figure 1. In this position, the locking member 35 is in the position best shown in Figure 3, in which position the axle 20 is securely engaged and held against lateral movement. With the axle 20 thus locked against swiveling, the plow may be backed without any possibility of the caster wheel shifting laterally out of position. When the plow is lifted, the rear wheel is lowered by the application of power to the link 18, as previously described. The member 19, which supports the wheel, is pushed downwardly with respect to the bars 13, whereby it is also pushed out of engagement with the locking member 34. In this position, the axle 20 may have a limited lateral movement with the plow partially aligned, as shown in Figure 4, or it may not be restricted in its movements at all, if the plow is lifted high enough so that the axle 20 does not engage the extension 35 on the locking member. The spring pressed roller 49 engages the notch 48 formed on an extension of the member 19 securely enough to prevent unintentional upward and downward movement of the member 19 with respect to the bars 13. However, when power is applied, the roller is displaced from the notch 48. The spring operated latch 30 also forms another means for preventing undue rotation of the axle 20.

Although applicant has shown a preferred embodiment of his improved device, it is to be understood that he contemplates as his invention all modifications thereof falling within the scope of the appended claims.

What is claimed as new is:

1. A caster wheel attachment for plows comprising a rearwardly extending bar attached to the plow beam, a caster wheel supporting member mounted on a linkage connected to said bar for vertical movement with respect thereto, power operated means for moving said member, a caster wheel axle swiveled in said member on an upwardly extending axis, said axle having a rearwardly extending portion on which a caster wheel is mounted, and a locking member attached at the rear of the bar, said member having a notched portion attached to engage the caster axle and hold it against swiveling movement when the plow is in operative position.

2. A caster wheel attachment for plows comprising a rearwardly extending bar attached to the plow beam, a caster wheel supporting member mounted on a linkage connected to said bar for vertical movement with respect thereto, power operated means for moving said member, a caster wheel axle swiveled in said member on an upwardly extending axis, said axle having a rearwardly extending portion on which a caster wheel is mounted, and a locking member attached at the rear of the bar, said member having a notched portion adapted to engage the caster axle and hold it against swiveling movement when the plow is in operative position, said notched portion having downwardly flared sides whereby the notch will seat on the axle over a wide angular variation in the position of the caster axle.

3. A caster wheel attachment for plows comprising a rearwardly extending bar attached to the plow beam, a caster wheel supporting member mounted on a linkage connected to said bar for vertical movement with respect thereto, power operated means for moving said member, a caster wheel axle swiveled in said member on an upwardly extending axis, said axle having a rearwardly extending portion on which a caster wheel is mounted, a locking member attached at the rear of the bar, said member having a notched portion adapted to engage the caster axle and hold it against swiveling movement when the plow is in operative position, and locking means for holding the supporting member in position when the plow is in operative position.

4. A caster wheel attachment for plows comprising rearwardly extending bars attached to the plow beam, a caster wheel supporting member slidably mounted between said bars, a supporting bracket mounted on said bars to which the supporting member is pivotally attached, a link pivotally connected to said bracket and to said member, a bell crank pivotally connected to said bracket and to the supporting member, means for applying power to said bell crank, an axle swivelly attached to the supporting member and extending rearwardly therefrom, a wheel mounted on said axle, and a locking member attached to the rear end of the rearwardly extending bars, said member depending downwardly from said bars and having a notched bottom portion adapted to engage the axle when the plow is in operative position.

In testimony whereof I affix my signature.

ARTHUR A. SCARLETT.